(12) United States Patent
Li et al.

(10) Patent No.: US 9,050,855 B2
(45) Date of Patent: Jun. 9, 2015

(54) AXLE BEAM HAVING A CAVITY

(71) Applicant: ArvinMeritor Technology, LLC, Troy, MI (US)

(72) Inventors: Degao Li, Windsor, CA (US); Tomaz Dopico Varela, Shelby Township, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 13/969,749

(22) Filed: Aug. 19, 2013

(65) Prior Publication Data

US 2015/0048583 A1 Feb. 19, 2015

(51) Int. Cl.
*B60B 35/00* (2006.01)
*B62D 7/18* (2006.01)

(52) U.S. Cl.
CPC .. *B60B 35/00* (2013.01); *B62D 7/18* (2013.01)

(58) Field of Classification Search
USPC ............... 280/93.512, 93.51, 93.511, 93.502, 280/93.166; 301/124.1, 127; 180/905
IPC .......................................................... B62D 7/18
See application file for complete search history.

(56) References Cited

U.S. PATENT DOCUMENTS

| | | | | |
|---|---|---|---|---|
| 1,181,612 | A * | 5/1916 | Reinke et al. | 280/93.512 |
| 2,432,708 | A * | 12/1947 | Ash | 280/93.512 |
| 6,799,811 | B1 * | 10/2004 | Dauber et al. | 301/124.1 |
| 7,686,312 | B2 * | 3/2010 | Fuks et al. | 280/93.512 |
| 8,177,246 | B2 * | 5/2012 | Cortez et al. | 280/124.175 |
| 8,490,986 | B1 | 7/2013 | Ostrander et al. | |
| 8,544,961 | B2 * | 10/2013 | Bubulka et al. | 301/127 |

FOREIGN PATENT DOCUMENTS

JP 11011105 A * 1/1999 .............. B60B 35/16

OTHER PUBLICATIONS

Disclosure Statement for U.S. Appl. No. 13/969,749, filed Aug. 19, 2013.

* cited by examiner

*Primary Examiner* — Faye M Fleming
(74) *Attorney, Agent, or Firm* — Brooks Kushman P.C.

(57) ABSTRACT

An axle beam having a beam portion and a kingpin mounting portion. The kingpin mounting portion may have a cavity that may be disposed adjacent to a kingpin hole and an end hole.

20 Claims, 3 Drawing Sheets

AXLE BEAM HAVING A CAVITY

TECHNICAL FIELD

This patent application relates to an axle beam having a cavity.

BACKGROUND

A steering knuckle assembly having an axle beam is disclosed in U.S. Pat. No. 8,490,986.

SUMMARY

In at least one embodiment, an axle beam is provided. The axle beam may include a beam portion and a kingpin mounting portion. The kingpin mounting portion may be disposed at an end of the beam portion. The kingpin mounting portion may include a kingpin hole, an end hole, and a cavity. The end hole may be spaced apart from the kingpin hole. The cavity may be disposed in the kingpin mounting portion adjacent to the kingpin hole and the end hole.

In at least one embodiment, an axle beam is provided. The axle beam may include a beam portion and a kingpin mounting portion disposed at opposite ends of the beam portion. Each kingpin mounting portion may include an upper wall, a lower wall, a first side wall, a second side wall, an arcuate end wall, and a cavity. The upper wall may have a first kingpin hole. The lower wall may have a second kingpin hole. The first side wall may extend from the upper wall to the lower wall. The second side wall may be spaced apart from the first side wall and may extend from the upper wall to the lower wall. The arcuate end wall may extend from the first side wall to the second side wall and may define an end hole. The cavity may be disposed in the kingpin mounting portion and may extend from the end hole toward the beam portion. The cavity may be at least partially defined by the upper wall, the lower wall, the first side wall, the second side wall, and the arcuate end wall.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
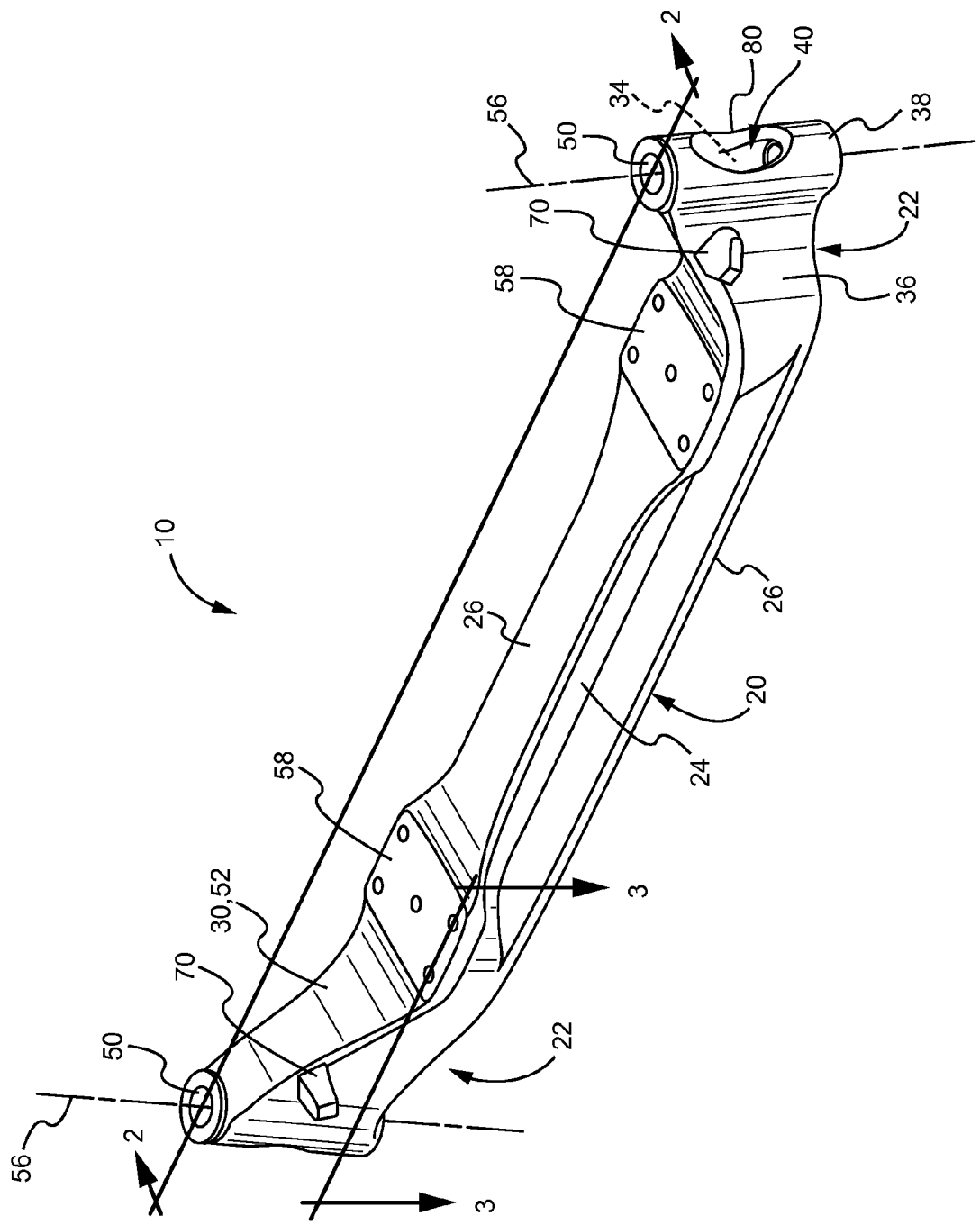
FIG. 1 is a perspective view of an exemplary axle beam.
Figure 2:
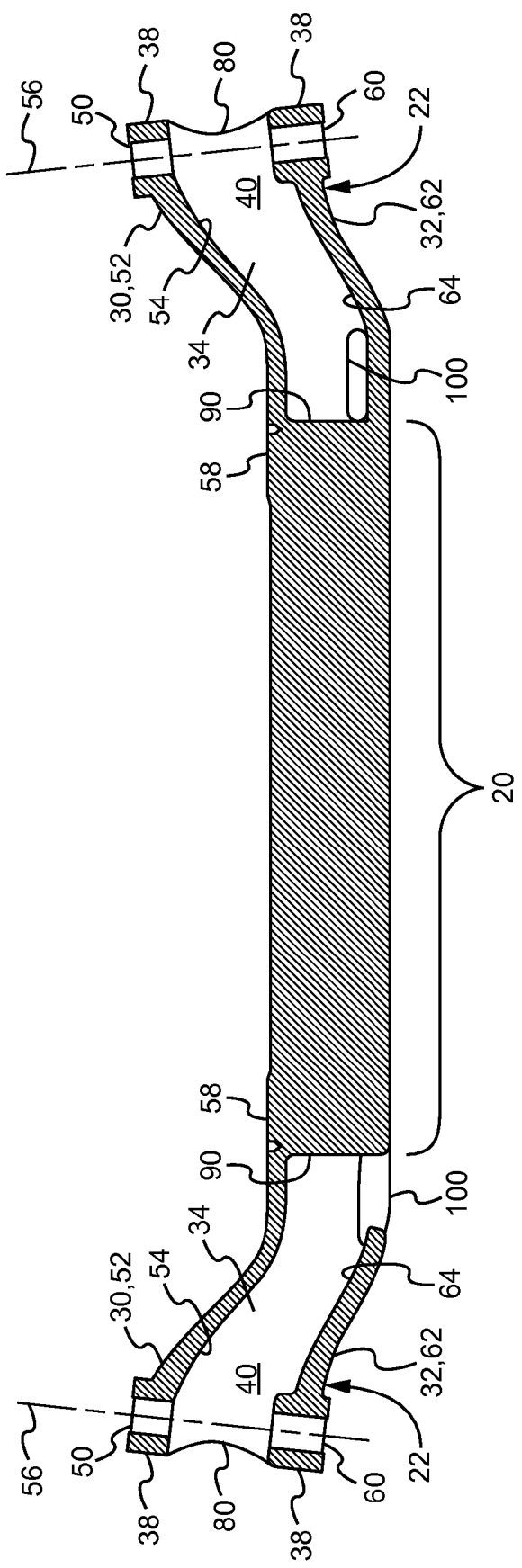
FIG. 2 is a section view of the axle beam along section line 2-2.
Figure 3:
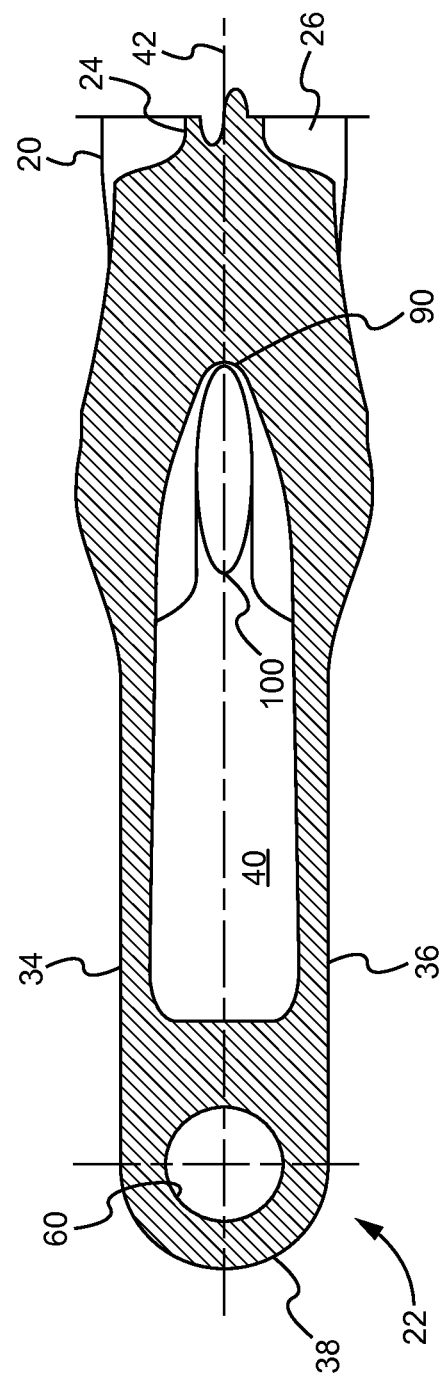
FIG. 3 is a section view of the axle beam along section line 3-3.

Referring to FIGS. 1-3, an exemplary axle beam 10 is shown. The axle beam 10 may be provided with a motor vehicle like a truck, bus, farm equipment, mining equipment, military transport or weaponry vehicle, or cargo loading equipment for land, air, or marine vessels. The axle beam 10 may be mounted to a vehicle and may be part of a steering system that may be used to steer or change the direction of the vehicle. In at least one embodiment, the axle beam 10 may include a beam portion 20 and a kingpin mounting portion 22.

The beam portion 20 may be disposed proximate the center of the axle beam 10. The beam portion 20 may be configured to be mounted to the vehicle and may have an I-beam configuration or an I-shaped cross section in which a web 24 may be disposed between and substantially perpendicular to flanges 26 that may be disposed at opposite ends of the web. The beam portion 20 may have a solid configuration that may be free of large voids or cavities in one or more embodiments.

The kingpin mounting portion 22 may be disposed at an end of the beam portion 20. As is best shown in FIGS. 1 and 2, a kingpin mounting portion 22 may be disposed at each end or opposite ends of the beam portion 20. The kingpin mounting portion 22 may be integrally formed with the beam portion 20. For example, the beam portion 20 and the kingpin mounting portion 22 may be cast as a one-piece component. Unlike the beam portion 20, the kingpin mounting portion 22 may not have an I-beam configuration to provide increased torsional strength as compared to the beam portion 20.

The kingpin mounting portion 22 may be configured to rotatably support a steering knuckle. More specifically, the kingpin mounting portion 22 may receive at least one kingpin that may couple a steering knuckle to the axle beam 10 such that the steering knuckle may pivot or rotate about the kingpin or kingpin axis with respect to the axle beam 10. The steering knuckle may have a spindle that may support one or more wheel bearings that in turn may support and facilitate rotation of a wheel hub and a vehicle wheel.

The kingpin mounting portion 22 may be offset from the beam portion 20 and may have a "gooseneck" configuration in which the kingpin mounting portion 22 extends further upward from the beam portion 20 as the distance from the beam portion 20 increases. In at least one embodiment, the kingpin mounting portion 22 may include an upper wall 30, a lower wall 32, a first side wall 34, a second side wall 36, an end wall 38, and a cavity 40.

The upper wall 30 may be disposed proximate an upper surface or top of the axle beam 10. The upper wall 30 may have a first kingpin hole 50 that may be configured to receive a kingpin. The first kingpin hole 50 may be a through hole that may extend through the upper wall 30. For example, the first kingpin hole 50 may extend from a first upper wall surface 52 to a second upper wall surface 54 that may be disposed opposite the first upper wall surface 52. The first upper wall surface 52 may be an exterior surface of the kingpin mounting portion 22. The second upper wall surface 54 may define a portion of the cavity 40. The first kingpin hole 50 may be disposed along a kingpin hole axis 56. The upper wall 30 may be curved such that the first kingpin hole 50 and at least a portion of the upper wall 30 may be disposed above the beam portion 20. The upper wall 30 may have a spring pad 58. The spring pad 58 may be configured to support and facilitate mounting of a spring, such as a leaf spring, to the axle beam 10. The spring may be part of a vehicle suspension system.

The lower wall 32 may be spaced apart from and disposed opposite the upper wall 30. The lower wall 32 may be disposed proximate a lower surface or bottom of the axle beam 10. The lower wall 32 may have a second kingpin hole 60 that may be configured to receive a kingpin. The second kingpin hole 60 may be a through hole that may extend through the lower wall 32. For example, the second kingpin hole 60 may extend from a first lower wall surface 62 to a second lower wall surface 64 that may be disposed opposite the first lower wall surface 62. The first lower wall surface 62 may be an exterior surface of the kingpin mounting portion 22. The second lower wall surface 64 may define a portion of the cavity 40. The first kingpin hole 50 and the second kingpin hole 60 may be coaxially disposed along the kingpin hole axis 56. In addition, the first kingpin hole 50 and the second kingpin hole 60 may receive a common kingpin or different kingpins in one or more embodiments. The lower wall 32 may also be curved such that the second kingpin hole 60 may be disposed above a bottom surface of the beam portion 20. In addition, the first and second upper wall surfaces 52, 54 may curve downward in a direction extending away from the first kingpin hole 50 toward the beam portion 20 such that the first and second upper wall surfaces 52, 54 may be disposed below the first kingpin hole 50 and the second upper wall surface 54 may be disposed below the second kingpin hole 60 in one or more embodiments.

The first side wall 34 may extend from the upper wall 30 to the lower wall 32. The first side wall 34 may be disposed generally perpendicular to the upper wall 30 and/or the lower wall 32 in one or more embodiments. As is best shown in FIG. 3, the first side wall 34 may be offset or spaced apart from a center beam axis 42 that may bisect the web 24 or extend through the center of the web 24 and extend laterally between the kingpin mounting portions 22.

The second side wall 36 may be spaced apart from and may be disposed opposite the first side wall 34. The second side wall 36 may extend from the upper wall 30 to the lower wall 32. The second side wall 36 may be disposed generally perpendicular to the upper wall 30 and/or the lower wall 32 in one or more embodiments. The second side wall 36 may also be offset or spaced apart from a center beam axis 42. As is best shown in FIG. 1, a stop boss 70 may be provided with the second side wall 36. The stop boss 70 may extend outwardly from the second side wall 36 or away from the cavity 40 and may limit rotation of a steering knuckle about the kingpin hole axis 56 with respect to the axle beam 10.

The end wall 38 may be disposed at a distal end of the axle beam 10. The end wall 38 may define a portion of the first kingpin hole 50 and/or second kingpin hole 60 and an end of the kingpin mounting portion 22. The end wall 38 may extend from the first side wall 34 to the second side wall 36 and/or from the upper wall 30 to the lower wall 32. The end wall 38 may be curved or have an arcuate configuration and may be radially disposed with respect to the kingpin hole axis 56.

The end wall 38 may have an end hole 80. The end hole 80 may be configured as a through hole that may extend through the end wall 38 to the cavity 40. In at least one embodiment, the end hole 80 may extend from the upper wall 30 to the lower wall 32. For example, the end hole 80 may extend from the second upper wall surface 54 to the second lower wall surface 64. The end hole 80 may be spaced apart from the first kingpin hole 50 and the second kingpin hole 60. In addition, the end hole 80 may have an oval configuration to reduce stress concentrations in the kingpin mounting portion 22 proximate the end hole 80. The end hole 80 may help reduce weight of the axle beam 10 and facilitate manufacturing of the axle beam 10. For example, the end hole 80 may be used to help support casting cores and may facilitate removal of sand from the cavity 40 that may be used to sand cast the axle beam 10.

The cavity 40 may be provided to reduce weight of the axle beam 10. The cavity 40 may be disposed in the kingpin mounting portion 22. The cavity 40 may extend from the end hole 80 toward the beam portion 20. The cavity 40 may be at least partially defined by the upper wall 30, the lower wall 32, the first side wall 34, the second side wall 36, and the end wall 38. The cavity 40 may also be partially defined by a cavity end wall 90. The cavity end wall 90 may define an end of the cavity 40 and may be disposed below the spring pad 58 in one or more embodiments. The cavity end wall 90 may extend from the upper wall 30 to the lower wall 32. In addition, the cavity 40 may narrow in a direction that extends from the end hole 80 to the cavity end wall 90 as is best shown in FIG. 3. Furthermore, the cavity end wall 90 may be located remotely from the first and second kingpin holes 50, 60 and may not be radially disposed with respect to the kingpin hole axis 56 as is best shown in FIG. 2. As such, the cavity end wall 90 may not define a portion of a kingpin hole and may not engage or be disposed adjacent to a kingpin that may be received in the first and second kingpin holes 50, 60.

A drain hole 100 may extend from the cavity 40. The drain hole 100, if provided, may facilitate drainage of water or environmental contaminants from the cavity 40. In addition, the drain hole 100 may facilitate manufacturing of the axle beam 10. For example, the drain hole 100 may facilitate removal of sand from the cavity 40 that may be used to sand cast the axle beam 10. The drain hole 100 may extend from the cavity 40 through the kingpin mounting portion 22 and may be provided in various configurations. For example, the drain hole 100 may extend through the lower wall 32 as is shown with the kingpin mounting portion 22 located at the left end of FIG. 2. In such a configuration, the drain hole 100 may be disposed proximate the cavity end wall 90 and may be spaced apart from and disposed below the upper wall 30, the first kingpin hole 50, the second kingpin hole 60, and the end hole 80 as is best shown in FIG. 2. Moreover, a portion of the drain hole 100, such as an end or edge of the drain hole 100, may be aligned with the cavity end wall 90 and may be disposed directly below the spring pad 58. The drain hole 100 may also extend through a side wall, such as the first side wall 34 and/or the second side wall 36. An example of a drain hole 100 that extends through a side wall is shown with the kingpin mounting portion 22 located at the right end of FIG. 2. In such a configuration, the drain hole 100 may be disposed near the bottom of the cavity 40, such as proximate or adjacent to the cavity end wall 90 and/or the second lower wall surface 64. The configurations shown at the left and right ends of the axle beam 10 in FIG. 2 are exemplary and a common drain hole configuration may be provided with each kingpin mounting portion 22. As is best shown in FIG. 3, the drain hole 100 may have an oval configuration. Such a configuration may be provided to reduce stress concentration and increase the size of the drain hole 100 to help reduce weight of the axle beam 10.

The axle beam configurations described above may help reduce axle beam weight by providing a hollow cross section proximate the kingpin mounting portion. Such a cross section may also position material away from the center of the kingpin mounting portion, which may provide increased strength and improved resistance to bending moments and torque that may be associated with wheel load forces. In addition, the axle beam configurations may be configured without features such as additional reinforcing ribs, thicker I-beam webs, or very large radii that may blend the web to beam flanges but may also add significant weight to the axle beam. Moreover, the axle beam configurations described above may be cast or formed as a one-piece component without welding, which may improve durability and reliability of the axle beam as compared to a multi-piece design and may reduce associated manufacturing costs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle beam comprising:
 a beam portion having an I-shaped cross section; and
 a kingpin mounting portion disposed at an end of the beam portion, wherein the kingpin mounting portion includes:
  a kingpin hole;
  an end hole that is spaced apart from the kingpin hole;
  a cavity that is disposed in the kingpin mounting portion adjacent to the kingpin hole and the end hole; and
  a drain hole that is spaced apart from the end hole and that extends from the cavity through the kingpin mounting portion.

2. The axle beam of claim 1 wherein the drain hole is disposed below the end hole.

3. The axle beam of claim 2 wherein the end hole and the drain hole have an oval configuration.

4. The axle beam of claim 2 wherein the drain hole is disposed proximate a cavity end wall that is disposed in the cavity and disposed opposite the end hole.

5. The axle beam of claim 2 wherein the drain hole extends through a lower wall of the kingpin mounting portion to the cavity.

6. The axle beam of claim 2 wherein the kingpin mounting portion has a side wall that partially defines the cavity and is offset from a center beam axis, wherein the drain hole extends through the side wall.

7. The axle beam of claim 1 wherein the kingpin mounting portion has an upper wall, a lower wall disposed opposite the upper wall, and first and second side walls that extend from the upper wall to the lower wall, wherein the upper wall, lower wall, and the first and second side walls cooperate to at least partially define the cavity.

8. The axle beam of claim 7 wherein the end hole extends from the upper wall to the lower wall.

9. The axle beam of claim 7 further comprising a cavity end wall that extends from the upper wall to the lower wall, wherein the cavity end wall is disposed at an end of the cavity.

10. The axle beam of claim 9 wherein the cavity narrows in a direction that extends from the end hole to the cavity end wall.

11. The axle beam of claim 9 wherein the upper wall has a spring pad, wherein the cavity end wall is disposed below the spring pad.

12. The axle beam of claim 1 wherein the cavity narrows in a direction that extends from the end hole toward the beam portion.

13. An axle beam comprising:
 a beam portion having an I-shaped cross section; and
 a kingpin mounting portion disposed at opposite ends of the beam portion, wherein each kingpin mounting portion includes:
  an upper wall having a first kingpin hole;
  a lower wall having a second kingpin hole;
  a first side wall that extends from the upper wall to the lower wall;
  a second side wall that is spaced apart from the first side wall and extends from the upper wall to the lower wall;
  an arcuate end wall that extends from the first side wall to the second side wall and defines an end hole; and
  a cavity that is disposed in the kingpin mounting portion and extends from the end hole toward the beam portion, wherein the cavity is at least partially defined by the upper wall, the lower wall, the first side wall, the second side wall, and the arcuate end wall.

14. The axle beam of claim 13 wherein the first kingpin hole and a second kingpin hole are coaxially disposed along a kingpin hole axis.

15. The axle beam of claim 14 wherein the arcuate end wall is radially disposed with respect to the kingpin hole axis.

16. The axle beam of claim 13 further comprising a drain hole that extends through the kingpin mounting portion adjacent to the lower wall.

17. The axle beam of claim 13 further comprising a cavity end wall that extends from the upper wall to the lower wall and from the first side wall to the second side wall, wherein the cavity end wall is disposed at an end of the cavity opposite the end hole.

18. The axle beam of claim 17 further comprising a drain hole that extends through the first side wall and/or the second side wall and is disposed adjacent to the cavity end wall.

19. The axle beam of claim 17 further comprising a drain hole that extends through the lower wall.

20. The axle beam of claim 19 wherein the drain hole is aligned with the cavity end wall.

* * * * *